US012801169B2

(12) United States Patent
Nakamuta et al.

(10) Patent No.: US 12,801,169 B2
(45) Date of Patent: Nov. 17, 2026

(54) CIRCUIT MODULE

(71) Applicant: Murata Manufacturing Co., Ltd., Nagaokakyo (JP)

(72) Inventors: Kazuhiro Nakamuta, Nagaokakyo (JP); Takahiro Katamata, Nagaokakyo (JP)

(73) Assignee: Murata Manufacturing Co., Ltd., Nagaokakyo (JP)

( * ) Notice: Subject to any disclaimer, the term of this patent is extended or adjusted under 35 U.S.C. 154(b) by 0 days.

(21) Appl. No.: 19/260,679

(22) Filed: Jul. 7, 2025

(65) Prior Publication Data

US 2026/0029809 A1 Jan. 29, 2026

(30) Foreign Application Priority Data

Jul. 29, 2024 (JP) ................................ 2024-122557

(51) Int. Cl.

*G06F 1/3287* (2019.01)
*G05F 1/46* (2006.01)
*G06F 1/3203* (2019.01)
*G06F 1/3206* (2019.01)

(52) U.S. Cl.

CPC .............. *G05F 1/46* (2013.01); *G06F 1/3203* (2013.01); *G06F 1/3206* (2013.01); *G06F 1/3287* (2013.01)

(58) Field of Classification Search

None
See application file for complete search history.

(56) References Cited

U.S. PATENT DOCUMENTS 6,968,467 B2 * 11/2005 Inoue .................... G06F 1/3203 713/320
7,836,320 B2 * 11/2010 Harris .................. G06F 1/3287 713/320
10,331,197 B2 * 6/2019 Yang .................... G09G 3/2096
11,537,192 B2 * 12/2022 Kitao .................... G06F 1/3268
12,117,887 B2 * 10/2024 Ono .......................... G06F 1/04
2014/0380070 A1 * 12/2014 Hua ...................... G06F 1/3237 713/320
2016/0242057 A1 8/2016 Riplpey et al.
2018/0052791 A1 * 2/2018 Srivastava ............ G06F 1/3296
2026/0099459 A1 * 4/2026 Nakamuta ........... G06F 13/4282

FOREIGN PATENT DOCUMENTS

JP H10178439 A 6/1998
JP 2006-023824 A 1/2006

* cited by examiner

*Primary Examiner* — Thomas J. Hiltunen
(74) *Attorney, Agent, or Firm* — McDonald Hopkins LLC

(57) ABSTRACT

A first die includes a power supply circuit and a first functional unit. A first slave circuit is included in the first die and is configured to receive a command in which a first slave ID is specified and, when the received command is a command that specifies a power mode of the first functional unit, set data that specifies the power mode of the first functional unit at a first power-mode setting register. A second die, which differs from the first die, includes a second functional unit. A second slave circuit is included in the second die and is configured to receive a command in which a second slave ID is specified and, when the received command is a command that specifies a power mode of the second functional unit, set data that specifies the power mode of the second functional unit at a second power-mode setting register.

8 Claims, 7 Drawing Sheets

FIG. 2

| FIRST POWER-MODE SETTING REGISTER (11P) | SECOND POWER-MODE SETTING SUB-REGISTER (12P) | POWER SUPPLY CIRCUIT (14) |
| --- | --- | --- |
| LOW POWER | LOW POWER | OFF |
| LOW POWER | ACTIVE | ON |
| ACTIVE | LOW POWER | ON |
| ACTIVE | ACTIVE | ON |

OPERATION IN RESPONSE TO COMMAND REQUESTING READOUT OF REGISTER VALUE

| | RUNNING MODE | TEST MODE |
|---|---|---|
| SECOND SLAVE CIRCUIT (21) | PERFORM READOUT | DOES NOT PERFORM READOUT |
| SECOND SUB-SLAVE CIRCUIT (12) | DOES NOT PERFORM READOUT | PERFORM READOUT |

FIG. 7

| FIRST POWER-MODE SETTING REGISTER (11P) | SECOND POWER-MODE SETTING SUB-REGISTER (12P) | MAIN POWER SUPPLY CIRCUIT (16) | BIAS CIRCUIT (17) | POWER SUPPLY CIRCUIT (14) |
|---|---|---|---|---|
| LOW POWER | LOW POWER | OFF | OFF | OFF |
| LOW POWER | ACTIVE | ON | OFF | ON |
| ACTIVE | LOW POWER | ON | ON | ON |
| ACTIVE | ACTIVE | ON | ON | ON |

FIG. 8

| REGISTER | FIRST REGISTER (11B) | SECOND SUB-REGISTER (12B) | SECOND REGISTER (21B) |
|---|---|---|---|
| FIRST CONTROL REGISTER | ○ | — | ○ |
| SECOND CONTROL REGISTER | ○ | — | ○ |
| POWER-MODE SETTING | ○ | ○ | ○ |
| PRODUCT ID_1 | ○ | ○ | ○ |
| ID INDICATING MANUFACTURER | ○ | ○ | ○ |
| INDIVIDUAL SLAVE ID | ○ | ○ | ○ |
| PRODUCT ID_2 | ○ | ○ | ○ |
| GROUP SLAVE ID | ○ | ○ | ○ |
| ERROR AND RESET | ○ | ○ | ○ |
| FUSE REGISTER | ○ | — | ○ |
| ADJUSTMENT REGISTER | ○ | — | ○ |

CIRCUIT MODULE

CROSS REFERENCE TO RELATED APPLICATION

This application claims priority from Japanese Patent Application No. 2024-122557, filed on Jul. 29, 2025. The content of this application is incorporated herein by reference in its entirety.

BACKGROUND OF THE DISCLOSURE

1. Field of the Disclosure

The present disclosure relates to a circuit module.

2. Description of the Related Art

A technique for data communication between a master device and multiple slave circuits via a serial bus is known for radio frequency communication modules (refer to U.S. Patent Application Publication No. 2016/0242057). A slave ID for identification is assigned to each of the multiple slave circuits. When the master device transmits via the serial bus a command in which a slave ID is set to specify one of the multiple slave circuits, a slave circuit having the slave ID set in the command performs a process in accordance with the command.

BRIEF SUMMARY OF THE DISCLOSURE

When multiple slave circuits are provided, each slave circuit is typically formed in or on a separate die, with the dies differing from one another. Each of the multiple dies includes a power supply circuit (voltage regulator) for activating functional units. If each of the multiple dies includes a power supply circuit, the circuit size of each die will increase. A possible benefit of the present disclosure is to provide a circuit module capable of avoiding an increase in circuit size of a module including multiple dies.

According to an aspect of the present disclosure, there is provided a circuit module including: a power supply circuit included in a first die; a first functional unit included in the first die; a first slave circuit included in the first die and configured to receive a command in which a first slave ID is specified and, when the received command is a command that specifies a power mode of the first functional unit, set data that specifies the power mode of the first functional unit at a first power-mode setting register; a second functional unit included in a second die that differs from the first die; a second slave circuit included in the second die and configured to receive a command in which a second slave ID is specified and, when the received command is a command that specifies a power mode of the second functional unit, set data that specifies the power mode of the second functional unit at a second power-mode setting register; a second sub-slave circuit included in the first die and configured to receive a command in which the second slave ID is specified and, when the received command is a command that specifies the power mode of the second functional unit, set data that specifies the power mode of the second functional unit at a second power-mode setting sub-register; a first power-supply line included in the first die and configured to transport electric power from the power supply circuit to the first functional unit; a second power-supply line connecting the first die and the second die and configured to transport electric power from the power supply circuit to the second functional unit; and a power-supply control circuit configured to activate the power supply circuit when at least one of the first power-mode setting register and the second power-mode setting sub-register is set to an active mode, wherein the power modes of the first functional unit and the second functional unit include the active mode and a low power mode.

The power supply circuit included in the first die is configured to supply electric power to the second functional unit included in the second die. Since the second die need not include a power supply circuit for the second functional unit, an increase in circuit size can be avoided. Data that specifies the power mode of the second functional unit included in the second die is set at the second power-mode setting sub-register included in the first die. Thus, the power-supply control circuit included in the first die is able to control the power supply circuit without referring to the second power-mode setting register included in the second die, and thereby an increase in the number of signal lines between the first die and the second die can be avoided.

BRIEF DESCRIPTION OF THE SEVERAL VIEWS OF THE DRAWINGS

FIG. 2 is a table illustrating the relationship between the setting of a first power-mode setting register 11P, the setting of a second power-mode setting sub-register 12P, and the operating state of a power supply circuit 14;

FIG. 7 is a table illustrating the relationship between the setting of the first power-mode setting register 11P, the setting of the second power-mode setting sub-register 12P, and the operating states of a main power supply circuit 16, a bias circuit 17, and the power supply circuit 14; and FIG. 8 illustrates individual registers included in a first register 11B, a second sub-register 12B, and a second register 21B (FIG. 3).

DETAILED DESCRIPTION OF THE DISCLOSURE

First Embodiment

A circuit module according to a first embodiment will be described with reference to FIGS. 1 to 5.

Figure 1:
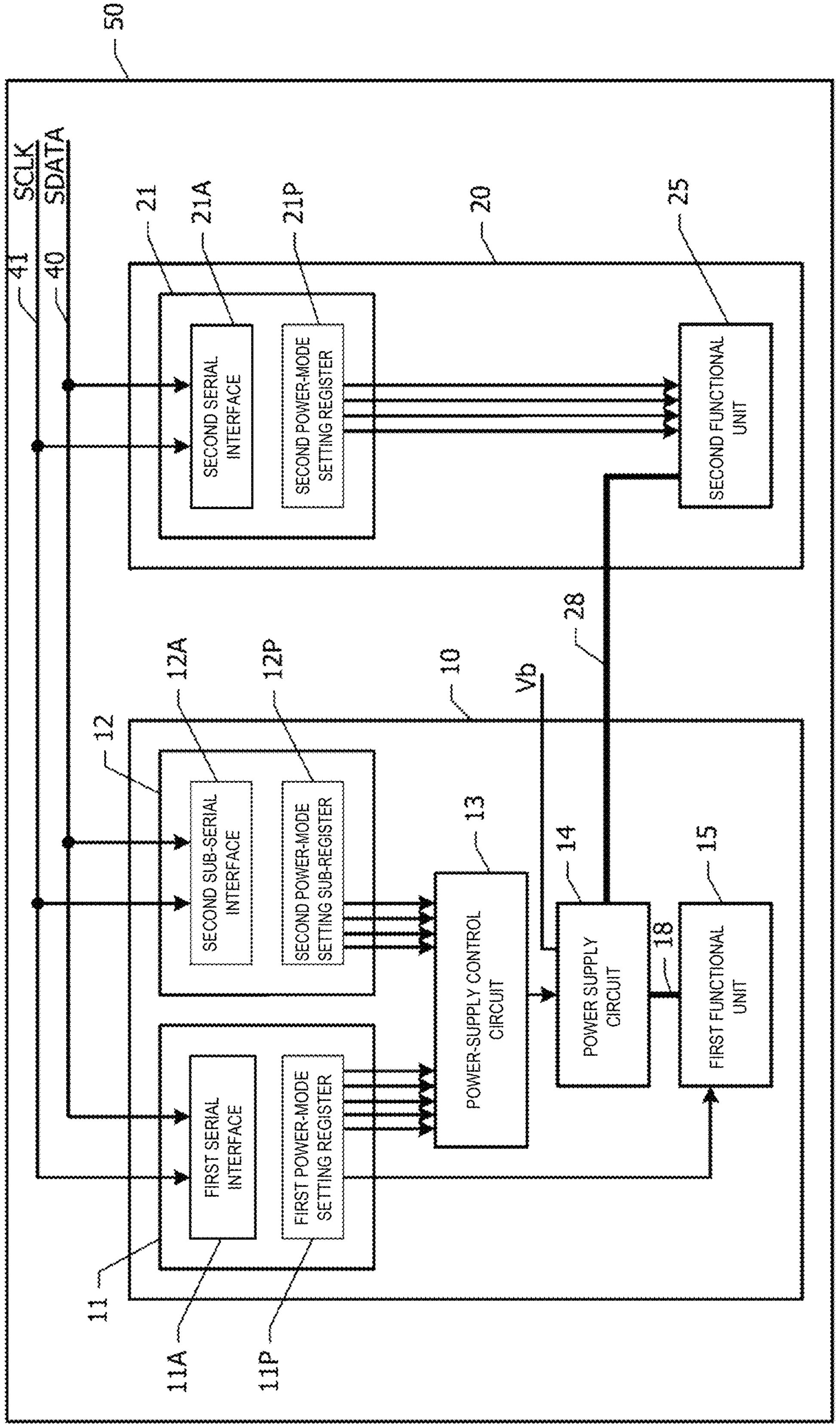
FIG. 1 is a block diagram of a circuit module according to a first embodiment.

FIG. 1 is a block diagram of the circuit module according to the first embodiment. The circuit module according to the first embodiment includes a first die 10 and a second die 20. The first die 10 and the second die 20 are mounted, for example, in or on a module board 50.

The first die 10 includes a first slave circuit 11, a second sub-slave circuit 12, a power-supply control circuit 13, a power supply circuit 14, and a first functional unit 15. The second die 20 includes a second slave circuit 21 and a second functional unit 25.

The first slave circuit 11 includes a first serial interface 11A and a first power-mode setting register 11P. The second sub-slave circuit 12 includes a second sub-serial interface 12A and a second power-mode setting sub-register 12P. The second slave circuit 21 includes a second serial interface 21A and a second power-mode setting register 21P. A clock signal SCLK is supplied to the first serial interface 11A, the second sub-serial interface 12A, and the second serial interface 21A via a clock line 41, and serial data SDATA is transmitted from a master device (not illustrated) via a serial bus 40. The serial data SDATA includes, for example, a command for the functional units included in each die.

Data that specifies a power mode of the first functional unit 15 is set at the first power-mode setting register 11P. Data that specifies a power mode of the second functional unit 25 is set at the second power-mode setting register 21P and the second power-mode setting sub-register 12P. It should be noted that the first slave circuit 11 includes multiple individual registers in addition to the first power-mode setting register 11P, and the second sub-slave circuit 12 includes multiple individual registers in addition to the second power-mode setting sub-register 12P. The second slave circuit 21 includes multiple individual registers in addition to the second power-mode setting register 21P.

A first slave ID is assigned to the first slave circuit 11, and a second slave ID is assigned to the second sub-slave circuit 12 and the second slave circuit 21. The first serial interface 11A is configured to receive a command in which the first slave ID is specified. When the received command is a command that specifies the power mode of the first functional unit 15, data that specifies the power mode of the first functional unit 15 is set at the first power-mode setting register 11P.

The second serial interface 21A and the second sub-serial interface 12A are both configured to receive a command in which the second slave ID is specified. When the received command is a command that specifies the power mode of the second functional unit 25, the second serial interface 21A sets data that specifies the power mode of the second functional unit 25 at the second power-mode setting register 21P, and the second sub-serial interface 12A sets data that specifies the power mode of the second functional unit 25 at the second power-mode setting sub-register 12P.

The power supply circuit 14 is configured to receive a battery voltage Vb from the module board 50 and stabilize the voltage. The first die 10 includes a first power-supply line 18. Electric power is supplied from the power supply circuit 14 to the first functional unit 15 via the first power-supply line 18. A second power-supply line 28 connects the first die 10 and the second die 20. More specifically, the second power-supply line 28 includes a line connected to the power supply circuit 14 included in the first die 10, a line in or on the module board 50, and a line connected to the second functional unit 25 included in the second die 20. Electric power is supplied from the power supply circuit 14 to the second functional unit 25 via the second power-supply line 28.

As the power modes of the first functional unit 15 and the second functional unit 25, one of an active mode and a low power mode is selected. Either the "active mode" or the "low power mode" is set at the first power-mode setting register 11P, the second power-mode setting sub-register 12P, and the second power-mode setting register 21P.

Next, electric power control by the power-supply control circuit 13 (FIG. 1) will be described with reference to FIG. 2. FIG. 2 is a table illustrating the relationship between the setting at the first power-mode setting register 11P, the setting at the second power-mode setting sub-register 12P, and the operating state of the power supply circuit 14.

The power-supply control circuit 13 (FIG. 1) is configured to set the power supply circuit 14 to the on state when at least one of the first power-mode setting register 11P and the second power-mode setting sub-register 12P is set to the active mode. This procedure enables electric power supply to the first functional unit 15 and the second functional unit 25. The power-supply control circuit 13 is configured to set the power supply circuit 14 to the off state when both the first power-mode setting register 11P and the second power-mode setting sub-register 12P are set to the low power mode. This procedure stops electric power supply to the first functional unit 15 and the second functional unit 25.

Next, detailed description will be given with regard to configurations and functions of the first slave circuit 11, the second sub-slave circuit 12, and the second slave circuit 21 with reference to FIG. 3.

Figure 3:
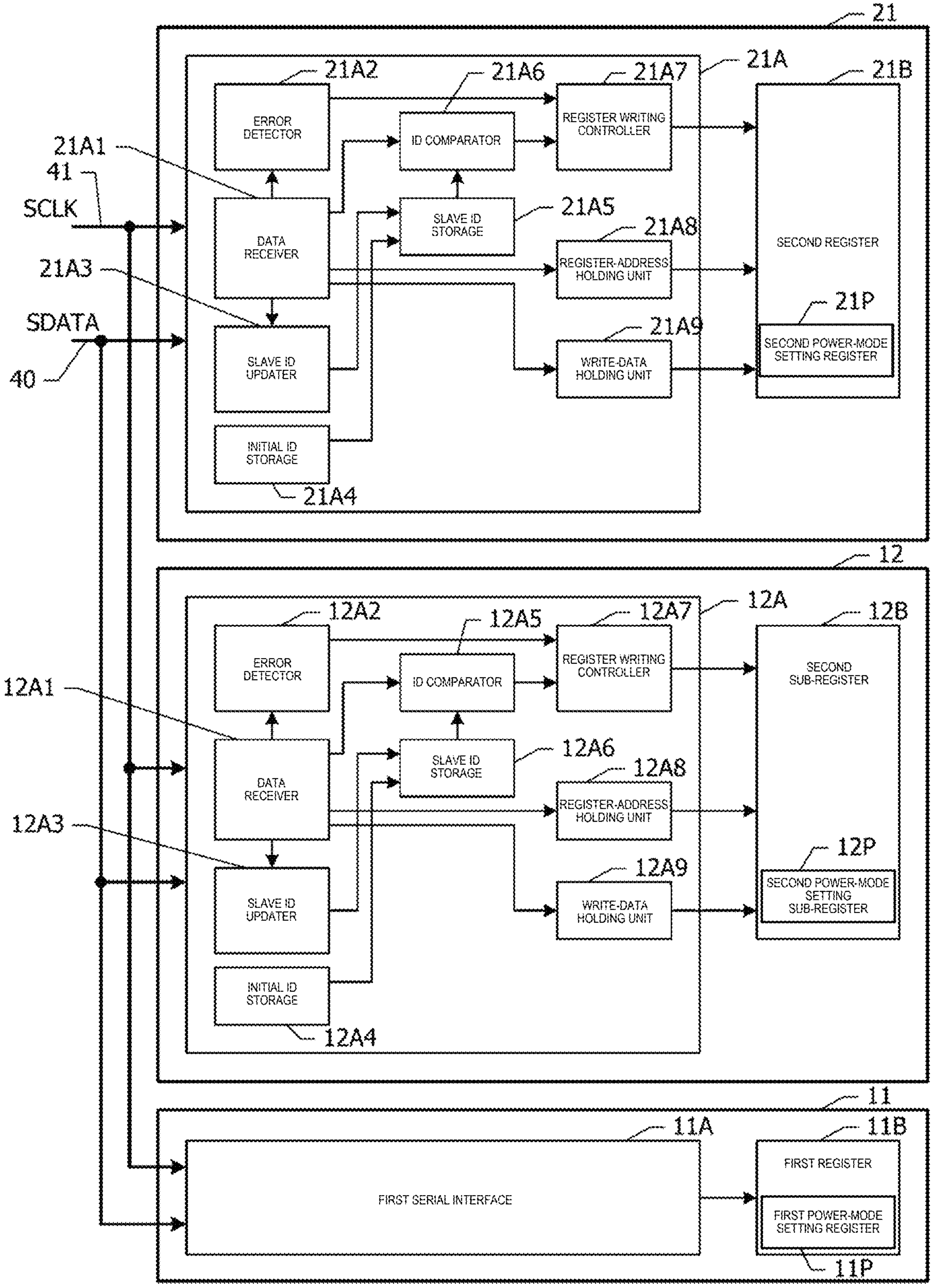
FIG. 3 is a block diagram illustrating a first slave circuit 11 and a second slave circuit 21.

FIG. 3 is a block diagram illustrating the first slave circuit 11, the second sub-slave circuit 12, and the second slave circuit 21. First, the function of the second serial interface 21A in the second slave circuit 21 will be described. A data receiver 21A1 receives a command transmitted via the serial bus 40. An error detector 21A2 detects an error in the received command. For example, an error detection code such as a parity bit is attached to the command, and the error detector 21A2 detects a reception error of the command based on the error detection code and provides the result of error detection to a register writing controller 21A7.

The initial value of the second slave ID assigned to the second slave circuit 21 is stored in an initial ID storage 21A4. In response to the second slave circuit 21 being reset, the initial value of the second slave ID is set in a slave ID storage 21A5. If the received command is free of errors and is a command to update the slave ID and the destination of the command is the current slave ID assigned to the second slave circuit 21, a slave ID updater 21A3 updates the value of the slave ID stored in the slave ID storage 21A5 to the value specified in the command. From the next command onward, the slave ID in the destination of a command is compared with the updated slave ID.

An ID comparator 21A6 compares the value of the slave ID that is set in the command received by the data receiver 21A1 with the value of the slave ID stored in the slave ID storage 21A5, and provides the result of comparison to the register writing controller 21A7.

A second register 21B includes multiple individual registers. The second power-mode setting register 21P (FIG. 1) is one of the individual registers in the second register 21B. A register-address holding unit 21A8 stores address data indicating an individual register in the second register 21B. When the received command is a command to rewrite the value of a register, the data receiver 21A1 saves to the register-address holding unit 21A8 the address of the target register in the second register 21B based on the content of the received command. Then, the data receiver 21A1 saves the value (data) to be set to a write-data holding unit 21A9 based on the content of the command.

If no error is detected by the error detector 21A2 and the result of comparison by the ID comparator 21A6 is "match", the register writing controller 21A7 writes the data stored in the write-data holding unit 21A9 to the register specified by the address stored in the register-address holding unit 21A8.

If an error is detected by the error detector 21A2 or if the result of comparison by the ID comparator 21A6 is "mismatch", the register writing controller 21A7 does not write data to the second register 21B. That is, a process of setting a register value is not performed.

Next, configurations and functions of the first slave circuit 11 and the second sub-slave circuit 12 will be described. The first slave circuit 11 includes the first serial interface 11A and a first register 11B. The first register 11B includes the first power-mode setting register 11P (FIG. 1) as an individual register. The second sub-slave circuit 12 includes the second sub-serial interface 12A and a second sub-register 12B. The second sub-register 12B includes the second power-mode setting sub-register 12P (FIG. 1) as an individual register.

Next, functions of the first serial interface 11A in the first slave circuit 11 and the second sub-serial interface 12A will be described. The second sub-serial interface 12A includes a data receiver 12A1, an error detector 12A2, a slave ID updater 12A3, an initial ID storage 12A4, an ID comparator 12A5, a slave ID storage 12A6, a register writing controller 12A7, a register-address holding unit 12A8, and a write-data holding unit 12A9. The functions of these blocks are the same as the functions of the corresponding blocks in the second serial interface 21A.

The initial value of the ID stored in the initial ID storage 12A4 in the second sub-serial interface 12A is the same as the initial value of the ID stored in the initial ID storage 21A4 in the second serial interface 21A. A command to update the slave ID is received by both the second serial interface 21A and the second sub-serial interface 12A, and the value in the slave ID storage 21A5 in the second serial interface 21A and the value in the slave ID storage 12A6 in the second sub-serial interface 12A are updated simultaneously. Thus, the value in the slave ID storage 21A5 in the second serial interface 21A and the value in the slave ID storage 12A6 in the second sub-serial interface 12A are always the same.

Since the function of the first serial interface 11A is the same as the function of the second serial interface 21A, detailed description thereof will be omitted. The initial value of the slave ID of the first serial interface 11A is different from the initial value of the slave ID of the second serial interface 21A.

Figures 4, 5:
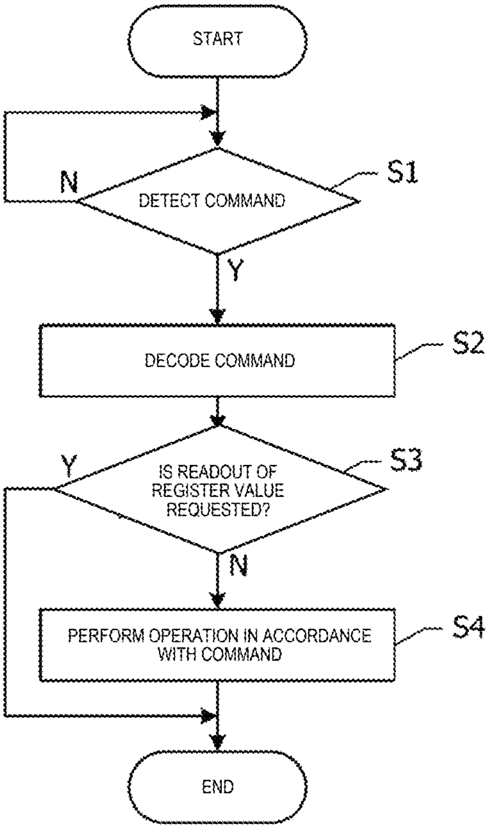
FIG. 4 is a flowchart illustrating procedures performed by a second sub-serial interface 12A (FIG. 1) included in a first die 10.
FIG. 5 is a table illustrating whether the second sub-serial interface 12A and a second serial interface 21A perform readout of a register value in response to receiving a command addressed to the second sub-serial interface 12A or the second serial interface 21A requesting readout of a register value.

Next, description will be given with regard to procedures performed by the second sub-serial interface 12A (FIG. 1) included in the first die 10 with reference to FIG. 4. FIG. 4 is a flowchart illustrating procedures performed by the second sub-serial interface 12A (FIG. 1) included in the first die 10. Upon receiving a command addressed to the second slave circuit 21 (step S1), the second sub-serial interface 12A decodes the command (step S2).

If the received command is a command to perform readout of a register value, a command reception process is terminated without performing readout of the register value. The second serial interface 21A in the second slave circuit 21, to which the same slave ID is assigned as to the second sub-serial interface 12A, also receives the same command. The second serial interface 21A reads the register value in response to the received command and transmits a reply message to the master device.

If the command received by the second sub-serial interface 12A is a command other than a command to perform readout of a register value, the second sub-serial interface 12A performs an operation in accordance with the content of the command (step S4). Once the reception process for one command is completed, the procedures illustrated in FIG. 4 are resumed, and the detection process for the next command is performed.

Next, a method of reading the content of the second sub-register 12B (FIG. 3) will be described with reference to FIG. 5. The second slave circuit 21 and the second sub-slave circuit 12 (FIG. 1) have a running mode and a test mode as operation modes. The second serial interface 21A and the second sub-serial interface 12A receives a command addressed to the second slave circuit 21, and thereby the operation modes are configured.

FIG. 5 is a table illustrating whether the second sub-serial interface 12A and the second serial interface 21A perform readout of a register value in response to receiving a command addressed to the second sub-serial interface 12A or the second serial interface 21A requesting readout of a register value.

When the operation mode is the running mode, upon receiving a command requesting readout of a register value, the second slave circuit 21 reads the register value and returns a message to the master device. The second sub-slave circuit 12 also receives the same command at this time, but the second sub-slave circuit 12 neither reads the register value nor replies to the master device. Either the second slave circuit 21 may be configured not to read a register value, or the second sub-slave circuit 12 may be configured not to read a register value when the operation mode is the test mode. When the second slave circuit 21 is configured not to read a register value, the second slave circuit 21 does not reply to the master device. Instead, the second sub-slave circuit 12 reads the register value and returns a message to the master device.

When the master device sets the slave ID of the second slave circuit 21 and transmits a command requesting readout of a register value, only one of the second slave circuit 21 and the second sub-slave circuit 12 returns a message, thereby avoiding contention of return messages.

Next, description will be given with regard to a positive effect according to the first embodiment.

In the first embodiment, electric power is supplied to the second functional unit 25 included in the second die 20 (FIG. 1) from the power supply circuit 14 included in the first die 10. Since the second die 20 need not include a power supply circuit, an increase in the circuit size of the second die 20 can be avoided in comparison with a configuration in which the second die 20 includes a power supply circuit.

The power supply circuit 14 included in the first die 10 supplies electric power to the second functional unit 25, and thus the power-supply control circuit 13 needs to obtain data that specifies the power mode of the second functional unit 25 included in the second die 20. In the first embodiment, data that specifies the power mode of the second functional unit 25 is set at the second power-mode setting sub-register 12P in the second sub-slave circuit 12 included in the first die 10 (FIG. 1). Thus, the power-supply control circuit 13 is able to perform on/off control of the power supply circuit 14 without referring to this data obtained from the second die 20. That is, there is no need to provide signal lines for sending data that specifies the power mode of the second functional unit 25 from the second die 20 to the first die 10.

Providing such signal lines requires space for the signal lines in or on the module board 50 (FIG. 1). In the first embodiment, since there is no need to allocate space for such signal lines, an increase in the size of the circuit module can be avoided.

Upon receiving a command to update a slave ID, the second serial interface 21A in the second slave circuit 21 updates the slave ID of the second slave circuit 21. This command is also received by the second sub-serial interface 12A, which then updates the slave ID of the second sub-slave circuit 12. Thus, no mismatch in slave ID occurs between the second serial interface 21A and the second sub-serial interface 12A.

If a command addressed to the second slave circuit 21 and transmitted via the serial bus 40 contains an error, the error is detected in the second slave circuit 21, and the register rewriting process in accordance with the command is not performed. In the first embodiment, the error detector 12A2 in the second sub-serial interface 12A (FIG. 3) has a function of detecting a reception error of a command, and this function is equivalent to the function of the error detector 21A2 in the second serial interface 21A (FIG. 3).

Thus, if an error is contained in a command addressed to the second slave circuit 21 and transmitted via the serial bus 40, the error is also detected in the second sub-serial interface 12A, and a register rewriting process in accordance with the command is not performed. This prevents a mismatch between the register value at the second register 21B and the register value at the second sub-register 12B. This makes it possible to maintain the consistency of operation between the power supply circuit 14 included in the first die 10 and the second functional unit 25 included in the second die 20.

In the first embodiment, upon receiving a command to perform readout of a register value, the second sub-serial interface 12A (FIG. 1) does not perform readout from a register (step S3 in FIG. 4). This avoids contention in which both the second serial interface 21A (FIG. 1) and the second sub-serial interface 12A (FIG. 1) respond to a command to perform readout from the second register 21B.

In the first embodiment, setting the operation mode of the second sub-slave circuit 12 to the test mode (FIG. 5) enables the master device to read a value from the second sub-register 12B (FIG. 3) in the second sub-slave circuit 12. This makes it easy to test and debug a communication module.

Second Embodiment

Next, a circuit module according to a second embodiment will be described with reference to FIGS. 6, 7, and 8. Description will be omitted herein with regard to configurations that are the same as or similar to the configurations of the circuit module according to the first embodiment, which has been described with reference to the drawings from FIG. 1 to FIG. 5.

Figure 6:
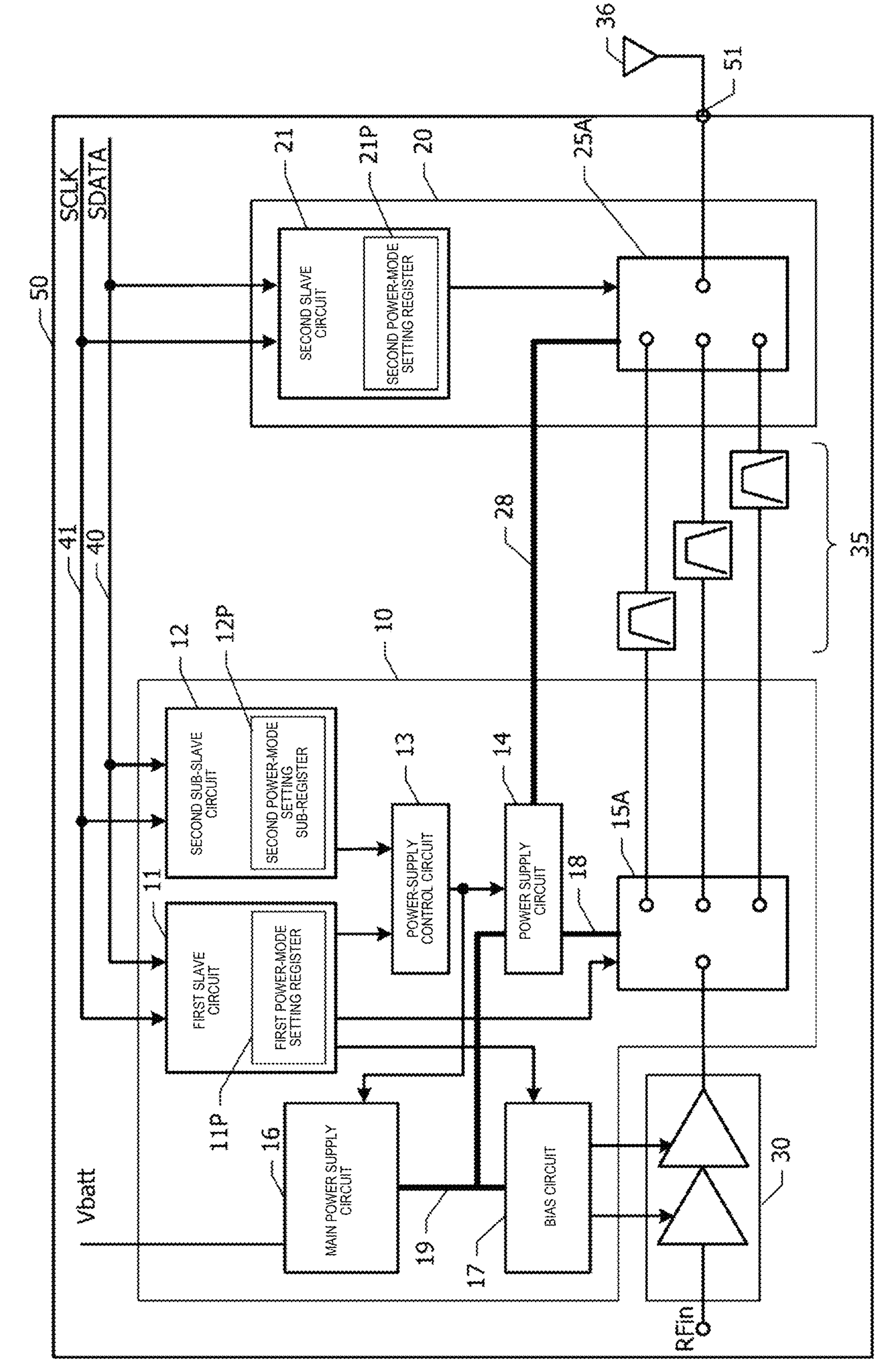
FIG. 6 is a block diagram of a circuit module according to a second embodiment.

FIG. 6 is a block diagram of the circuit module according to the second embodiment. In the second embodiment, a band selection switch 15A and an antenna switch 25A are used as the first functional unit 15 and the second functional unit 25 according to the first embodiment (FIG. 1), respectively. An antenna terminal 51 of the module board 50 is connected to an antenna 36.

The first die 10 includes a main power supply circuit 16 and a bias circuit 17 in addition to the first slave circuit 11, the second sub-slave circuit 12, the power-supply control circuit 13, the power supply circuit 14, and the band selection switch 15A. The module board 50 includes a transmitter circuit 30 and multiple filters 35 in addition to the first die 10 and the second die 20. The transmitter circuit 30 includes a radio frequency amplifier including components such as a heterojunction bipolar transistor and is configured to amplify a radio frequency signal RFin. Each of the multiple filters 35 is a band pass filter configured to pass radio frequency signals in a corresponding frequency band of a communication standard such as the fifth generation mobile communication system (5G).

The main power supply circuit 16 is configured to stabilize a battery voltage Vbatt supplied from an external source and supply electric power to the power supply circuit 14 and the bias circuit 17 included in the first die 10 via a power-supply line 19. The main power supply circuit 16 is subjected to on/off control by a command from the power-supply control circuit 13. The bias circuit 17 is configured to supply a bias to an amplifier in the transmitter circuit 30 based on a command from the first slave circuit 11. The power supply circuit 14 is configured to supply electric power to the band selection switch 15A and the antenna switch 25A in the same manner as in the first embodiment (FIG. 1).

The band selection switch 15A is configured to select one filter 35 from the multiple filters 35 based on a command from the first slave circuit 11 and connect the selected filter 35 to the transmitter circuit 30. The antenna switch 25A is configured to select one of the multiple filters 35 based on a command from the second slave circuit 21 and connect the selected filter 35 to the antenna terminal 51. A radio frequency signal amplified by the transmitter circuit 30 is supplied to the antenna 36 via the band selection switch 15A, the selected filter 35, the antenna switch 25A, and the antenna terminal 51.

FIG. 7 is a table illustrating the relationship between the setting of the first power-mode setting register 11P, the setting of the second power-mode setting sub-register 12P, and the operating states of the main power supply circuit 16, the bias circuit 17, and the power supply circuit 14. The power-supply control circuit 13 is configured to set both the main power supply circuit 16 and the power supply circuit 14 to the on state when at least one of the first power-mode setting register 11P and the second power-mode setting sub-register 12P is set to the active mode. The power-supply control circuit 13 is configured to set both the main power supply circuit 16 and the power supply circuit 14 to the off state when both the first power-mode setting register 11P and the second power-mode setting sub-register 12P are set to the low power mode.

The first slave circuit 11 is configured to set the bias circuit 17 to the off state when the first power-mode setting register 11P is set to the low power mode, and the first slave circuit 11 is configured to set the bias circuit 17 to the on state when the first power-mode setting register 11P is set to the active mode.

FIG. 8 illustrates multiple individual registers included in the first register 11B, the second sub-register 12B, and the second register 21B (FIG. 3). In FIG. 8, a circle means that an individual register is provided, and a dash means that an individual register is not provided. As illustrated in FIG. 8, the second sub-register 12B provides only a subset of the multiple individual registers provided in the second register 21B. The same value is set at each of the multiple individual registers in the second sub-register 12B and at a corresponding individual register in the second register 21B.

Next, the meaning of each of the multiple individual registers will be described. The second register 21B includes a first control register and a second control register for controlling the antenna switch 25A (FIG. 6). The value at the second control register is also used to control the bias circuit 17 (FIG. 6).

The power-mode setting registers for the first register 11B, the second sub-register 12B, and the second register 21B correspond to the first power-mode setting register 11P, the second power-mode setting sub-register 12P, and the second power-mode setting register 21P (FIG. 6), respectively.

The product ID_1 register and the ID register indicating the manufacturer are registers at which a product ID and a manufacture ID are set, respectively. The individual slave ID register is a register at which a slave ID is set. The product ID_2 register is a register at which an extended product ID is set. The group slave ID register is a register at which a group slave ID is set. The error and reset register contains an error flag and a flag to cause a soft reset. The Fuse register is a register for controlling a fuse. The adjustment register is a register for analog adjustment.

Next, description will be given with regard to a positive effect according to the second embodiment.

In the second embodiment, as in the first embodiment, since the second die 20 need not include a power supply circuit, an increase in the circuit size of the second die 20 can be avoided. In addition, a signal line need not be provided to send data that specifies the power mode of the antenna switch 25A from the second die 20 to the first die 10. Thus, an increase in the size of the circuit module can be avoided.

When a radio frequency signal is transmitted, the first power-mode setting register 11P and the second power-mode setting sub-register 12P are both set to the active mode, so that the bias circuit 17 is operated and electric power is supplied to the band selection switch 15A and the antenna switch 25A, as illustrated in FIG. 7. When a signal is received, the first power-mode setting register 11P is set to the low power mode, and the second power-mode setting sub-register 12P is set to the active mode. This procedure enables the antenna switch 25A to operate, and a signal received by the antenna 36 (FIG. 6) can be transmitted to a receiver circuit (not illustrated). Since the bias circuit (FIG. 6) is in the off state at this time, unnecessary electric power consumption can be avoided.

The second sub-register 12B includes individual registers corresponding to a subset of the multiple individual registers in the second register 21B, and none of the individual registers outside the subset has a corresponding individual register in the second sub-register 12B. Thus, an increase in the circuit size of the second sub-slave circuit 12 can be avoided.

The above embodiments are described for illustration, and partial substitutions or combinations of the configurations described in different embodiments are obviously feasible. Similar operations and similar effects achievable by similar configurations described in multiple embodiments are not individually described in each of the embodiments. Further, the present disclosure is not limited to the above embodiments. For example, it should be apparent to those skilled in the art that various kinds of modification, improvement, combination, and the like are feasible.

Based on the above embodiments described in this specification, the following disclosure is disclosed.

<1> A circuit module comprising: a power supply circuit included in a first die; a first functional unit included in the first die; a first slave circuit included in the first die and configured to receive a command in which a first slave ID is specified and, when the received command is a command that specifies a power mode of the first functional unit, set data that specifies the power mode of the first functional unit at a first power-mode setting register; a second functional unit included in a second die that differs from the first die; a second slave circuit included in the second die and configured to receive a command in which a second slave ID is specified and, when the received command is a command that specifies a power mode of the second functional unit, set data that specifies the power mode of the second functional unit at a second power-mode setting register; a second sub-slave circuit included in the first die and configured to receive a command in which the second slave ID is specified and, when the received command is a command that specifies the power mode of the second functional unit, set data that specifies the power mode of the second functional unit at a second power-mode setting sub-register; a first power-supply line included in the first die and configured to transport electric power from the power supply circuit to the first functional unit; a second power-supply line connecting the first die and the second die and configured to transport electric power from the power supply circuit to the second functional unit; and a power-supply control circuit configured to activate the power supply circuit when at least one of the first power-mode setting register and the second power-mode setting sub-register is set to an active mode, wherein the power modes of the first functional unit and the second functional unit include the active mode and a low power mode.

<2> The circuit module according to <1>, wherein the first functional unit includes a band selection switch configured to select one filter from a plurality of filters and connect the selected filter to a transmitter circuit, and the second functional unit includes an antenna switch configured to select one of the plurality of filters and connect the selected filter to an antenna.

<3> The circuit module according to <1> or <2>, further comprising: a serial bus connected to the first slave circuit, the second slave circuit, and the second sub-slave circuit, wherein a command is input to the first slave circuit, the second slave circuit, and the second sub-slave circuit via the serial bus.

<4> The circuit module according to any one of <1> to <3>, wherein the second slave circuit has a function of detecting a reception error of a command and is configured, in response to detecting the reception error, refrain from performing a process of setting a value at the second power-mode setting register corresponding to the command for which the reception error has been detected, and the second sub-slave circuit has a function of detecting a reception error of a command and is configured, in response to detecting the reception error, refrain from performing a process of setting a value at the second power-mode setting sub-register corresponding to the command for which the reception error has been detected.

<5> The circuit module according to any one of <1> to <4>, wherein the second slave circuit includes a plurality of individual registers in addition to the second power-mode setting register, and the second sub-slave circuit includes one or more individual registers corresponding to a subset of the plurality of individual registers in the second slave circuit, the same value is set at each of the individual registers in the second sub-slave circuit and at a corresponding one of the subset of the plurality of individual registers in the second slave circuit, and none of the individual registers outside the subset in the second slave circuit has a corresponding individual register in the second sub-slave circuit.

What is claimed is:

1. A circuit module comprising:

a power supply circuit in a first die;

a first functional circuit unit in the first die;

a first slave circuit in the first die and configured to receive a first command in which a first slave ID is specified and, when the received first command is a command that specifies a power mode of the first functional circuit unit, set data that specifies the power mode of the first functional circuit unit at a first power-mode setting register;

a second functional circuit unit in a second die that differs from the first die;

a second slave circuit in the second die and configured to receive a second command in which a second slave ID is specified and, when the received second command is a command that specifies a power mode of the second functional circuit unit, set data that specifies the power mode of the second functional circuit unit at a second power-mode setting register;

a second sub-slave circuit in the first die and configured to receive a third command in which the second slave ID is specified and, when the received third command is a command that specifies the power mode of the second functional circuit unit, set data that specifies the power mode of the second functional circuit unit at a second power-mode setting sub-register;

a first power-supply line in the first die and configured to transport electric power from the power supply circuit to the first functional circuit unit;

a second power-supply line connecting the first die and the second die, and configured to transport electric power from the power supply circuit to the second functional circuit unit; and a power-supply control circuit configured to activate the power supply circuit when the first power-mode setting register or the second power-mode setting sub-register is set to an active mode, wherein the active mode and a low power mode are power modes of the first functional circuit unit and the second functional circuit unit.

2. The circuit module according to claim 1, wherein the first functional circuit unit comprises a band selection switch configured to select one filter from a plurality of filters and to connect the selected filter to a transmitter circuit, and wherein the second functional circuit unit comprises an antenna switch configured to select one of the plurality of filters and to connect the selected filter to an antenna.

3. The circuit module according to claim 1, further comprising:

a serial bus connected to the first slave circuit, the second slave circuit, and the second sub-slave circuit, wherein a command is input to the first slave circuit, the second slave circuit, and the second sub-slave circuit via the serial bus.

4. The circuit module according to claim 2, further comprising:

a serial bus connected to the first slave circuit, the second slave circuit, and the second sub-slave circuit, wherein a command is input to the first slave circuit, the second slave circuit, and the second sub-slave circuit via the serial bus.

5. The circuit module according to claim 1, wherein the second slave circuit is configured to detect a reception error of the first command and, in response to detecting the reception error, refrain from setting a value at the second power-mode setting register corresponding to the first command for which the reception error was detected, and wherein the second sub-slave circuit is configured to detect a reception error of the second command and, in response to detecting the reception error, refrain from setting a value at the second power-mode setting sub-register corresponding to the second command for which the reception error was detected.

6. The circuit module according to claim 2, wherein the second slave circuit is configured to detect a reception error of the first command and, in response to detecting the reception error, refrain from setting a value at the second power-mode setting register corresponding to the first command for which the reception error was detected, and wherein the second sub-slave circuit is configured to detect a reception error of the second command and, in response to detecting the reception error, refrain from setting a value at the second power-mode setting sub-register corresponding to the second command for which the reception error was detected.

7. The circuit module according to claim 1, wherein the second slave circuit comprises a plurality of individual registers in addition to the second power-mode setting register, and wherein the second sub-slave circuit comprises one or more individual registers corresponding to a subset of the plurality of individual registers in the second slave circuit, the same value is set at each of the individual registers in the second sub-slave circuit and at a corresponding one of the subset of the plurality of individual registers in the second slave circuit, and none of the individual registers outside the subset in the second slave circuit has a corresponding individual register in the second sub-slave circuit.

8. The circuit module according to claim 2, wherein the second slave circuit comprises a plurality of individual registers in addition to the second power-mode setting register, and wherein the second sub-slave circuit comprises one or more individual registers corresponding to a subset of the plurality of individual registers in the second slave circuit, the same value is set at each of the individual registers in the second sub-slave circuit and at a corresponding one of the subset of the plurality of individual registers in the second slave circuit, and none of the individual registers outside the subset in the second slave circuit has a corresponding individual register in the second sub-slave circuit.

* * * * *